United States Patent
Huang et al.

(10) Patent No.: US 9,961,014 B2
(45) Date of Patent: May 1, 2018

(54) NETWORK COMMUNICATION METHOD BASED ON SOFTWARE-DEFINED NETWORKING AND SERVER USING THE METHOD

(71) Applicant: NANNING FUGUI PRECISION INDUSTRIAL CO., LTD., Nanning (CN)

(72) Inventors: Chih-Yuan Huang, New Taipei (TW); Ming-Chin Ho, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 194 days.

(21) Appl. No.: 14/940,393

(22) Filed: Nov. 13, 2015

(65) Prior Publication Data

US 2017/0142028 A1 May 18, 2017

(51) Int. Cl.
*H04L 12/927* (2013.01)
*H04L 12/715* (2013.01)
*H04L 12/911* (2013.01)
*H04L 29/12* (2006.01)
*H04L 29/08* (2006.01)

(52) U.S. Cl.
CPC ............ *H04L 47/808* (2013.01); *H04L 45/64* (2013.01); *H04L 47/781* (2013.01); *H04L 61/2007* (2013.01); *H04L 61/2589* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 7,668,962 B2* | 2/2010 | Tran | ..................... | G06F 11/2012 370/352 |
| 9,253,028 B2* | 2/2016 | DeCusatis | ........... | H04L 41/0681 |
| 9,356,915 B2* | 5/2016 | Johnston | ............. | H04L 63/0421 |
| 2006/0179147 A1* | 8/2006 | Tran | ..................... | G06F 11/2012 709/227 |
| 2013/0128891 A1* | 5/2013 | Koponen | ............ | H04L 41/0823 370/392 |
| 2015/0033300 A1* | 1/2015 | Timariu | ................ | H04L 63/168 726/5 |
| 2015/0172103 A1* | 6/2015 | DeCusatis | ........... | H04L 41/0681 370/389 |
| 2015/0188882 A1 | 7/2015 | Wang et al. | | |
| 2015/0188902 A1* | 7/2015 | Yoakum | ................ | H04L 63/083 726/7 |

(Continued)

FOREIGN PATENT DOCUMENTS

| | | |
|---|---|---|
| TW | 201541983 A | 11/2015 |
| WO | 2014209007 A1 | 12/2014 |

*Primary Examiner* — Ayaz Sheikh
*Assistant Examiner* — Faiyazkhan Ghafoerkhan
(74) *Attorney, Agent, or Firm* — ScienBiziP, P.C.

(57) ABSTRACT

An SDN-enabled network communication method is disclosed. A master TURN server sends a client an error response and assigns a relay switch as a backup server for the client using an alternate-server mechanism. Therefore, data streams of the client are directly transferred to the relay switch. With support by a shadow TURN server and an SDN controller, switches forwarding the data streams are managed according to the OpenFlow protocol to implement path optimization for the data streams.

15 Claims, 3 Drawing Sheets

(56) References Cited

U.S. PATENT DOCUMENTS

| | | | |
|---|---|---|---|
| 2015/0215290 A1* | 7/2015 | Johnston | H04L 63/0421 |
| | | | 726/3 |
| 2015/0359033 A1* | 12/2015 | Stojanovski | H04W 72/0413 |
| | | | 370/328 |
| 2016/0050179 A1* | 2/2016 | Wang | H04L 61/2589 |
| | | | 726/12 |
| 2016/0099890 A1* | 4/2016 | Kaufman | H04L 61/2575 |
| | | | 709/203 |
| 2017/0026422 A1* | 1/2017 | Klein | H04L 67/1021 |
| 2017/0180202 A1 | 6/2017 | Menezes et al. | |

* cited by examiner

NETWORK COMMUNICATION METHOD BASED ON SOFTWARE-DEFINED NETWORKING AND SERVER USING THE METHOD

FIELD

The subject matter herein generally relates to a network communication method based on software-defined networking.

BACKGROUND

Software-defined networking (SDN) is an approach to computer networking that allows network administrators to manage network services through abstraction of higher-level functionality. This is done by decoupling the system that makes decisions about where traffic is sent (the control plane) from the underlying systems that forward traffic to the selected destination (the data plane). The control plane communicates with the data plane via the OpenFlow protocol.

A hybrid SDN network utilizes both legacy hardwired switches and software programmable switches that use SDN protocols. This mixed mode of operation is found as service providers migrate legacy networks to SDN technology.

Under the hybrid SDN network; there are problems such as complicated configurations or additional hardware equipments that are required to increase the cost when initializing an existing network application.

BRIEF DESCRIPTION OF THE DRAWINGS

Implementations of the present technology will now be described, by way of example only, with reference to the attached figures.

DETAILED DESCRIPTION

Figure 1:
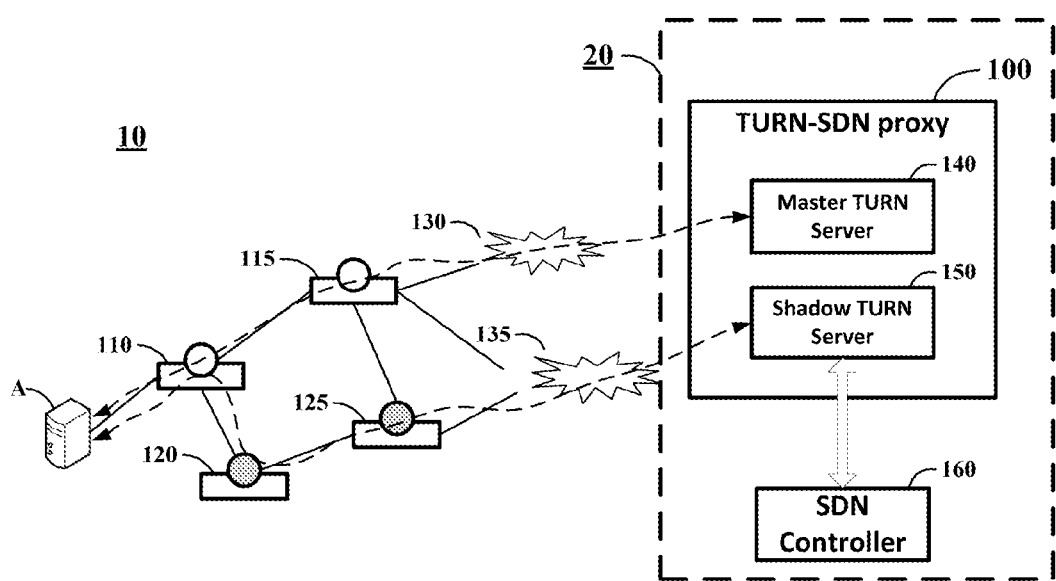
FIG. 1 illustrates a block diagram of an embodiment of an SDN network communication system in accordance with the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

A software-defined networking (SDN) network communication method and system of the present disclosure introduces data streams into an SDN infrastructure using the Traversal Using Relays around Network Address Translation (TURN) protocol. In other words, data streams are transferred through relay servers using the TURN protocol. The method of disclosure operates in a hybrid network infrastructure, enabling the TURN data streams to be processed by network apparatuses, such as OpenFlow switches.

FIG. 1 illustrates a block diagram of an embodiment of an software-defined networking (SDN) network communication system in accordance with the present disclosure.

In one embodiment, the SDN network communication system 10 includes a server 20, a first forwarding device 110, a second forwarding device 115, a third forwarding device 120, a fourth forwarding device 125, a first network 130, a second network 135 and a client A. In the embodiment, the server 20 comprises a processor (not shown), a storage unit (not shown), a TURN-SDN proxy 100 and an SDN controller 160. The TURN-SDN proxy 100 further comprises a master TURN server 140 and a shadow TURN server 150.

The one or more functional modules can include computerized code in the form of one or more programs that are stored in the storage unit (not shown), and executed by the processor (not shown) to provide functions of the server 20. The storage unit (not shown) can be a dedicated memory, such as an EPROM or a flash memory. Descriptions of the functional blocks are given with reference to FIG. 1.

In one embodiment, the first forwarding device 110 and the second forwarding device 115 are legacy devices, such as switches or routers. The third forwarding device 120 and the fourth forwarding device 125 are SDN devices complying with the OpenFlow protocol. The first network 130 and the second network 135 are wide area networks (WAN) or other types of networks. An embodiment of the SDN network communication system 10 comprises, but is not limited to, the described four forwarding devices.

The master TURN server 140 sends the client A an error response which assigns a relay switch as a backup server for the client A using an alternate-server mechanism. Therefore, data streams of the client A are directly transferred to the assigned relay switch. With support by the shadow TURN server 150 and the SDN controller 160, switches forwarding of the data streams are managed according to the OpenFlow protocol to implement path optimization for the data streams.

Figure 2A:
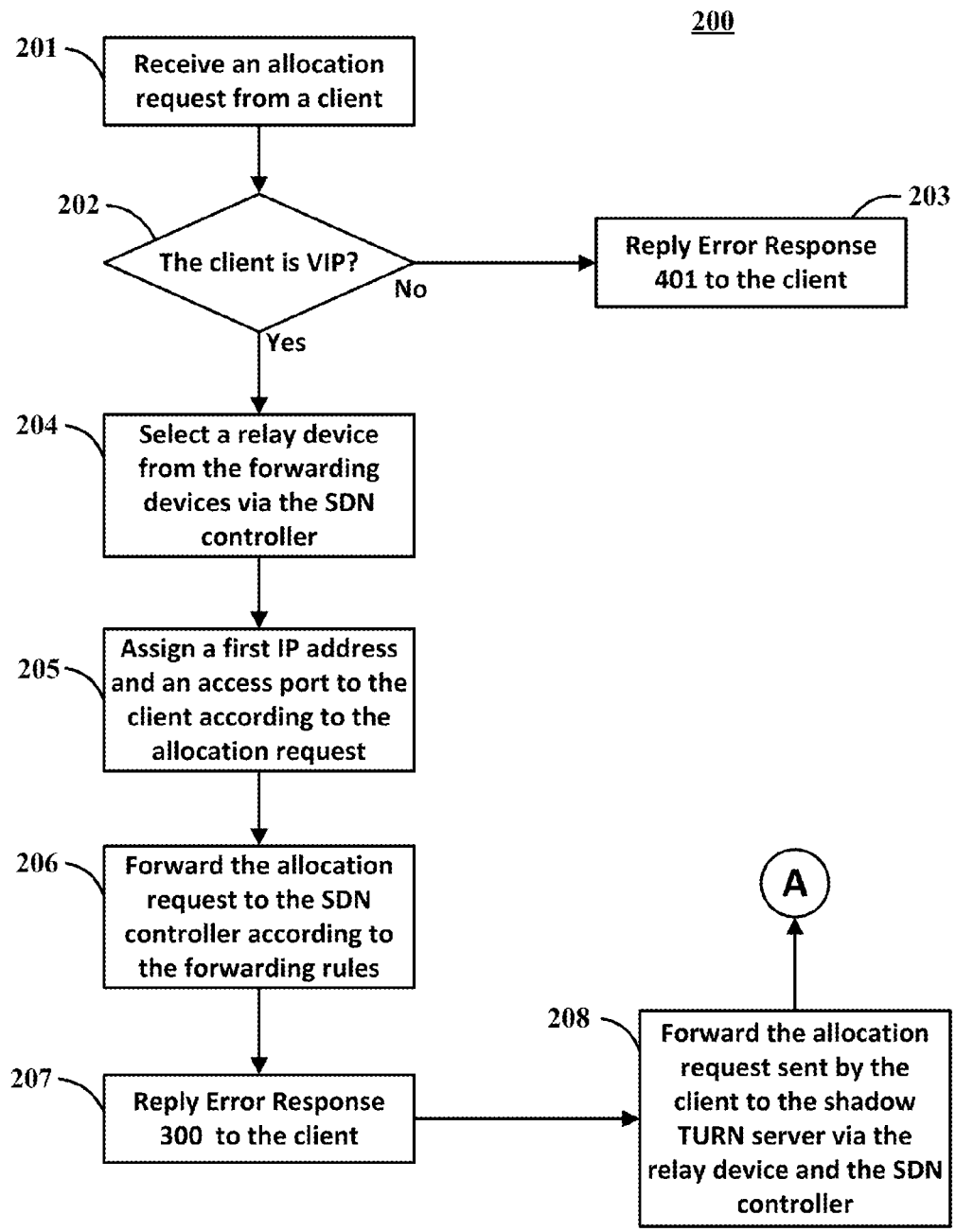
FIGS. 2A and 2B illustrate a flowchart of an embodiment of an SDN network communication method in accordance with the present disclosure.
Figure 2B:
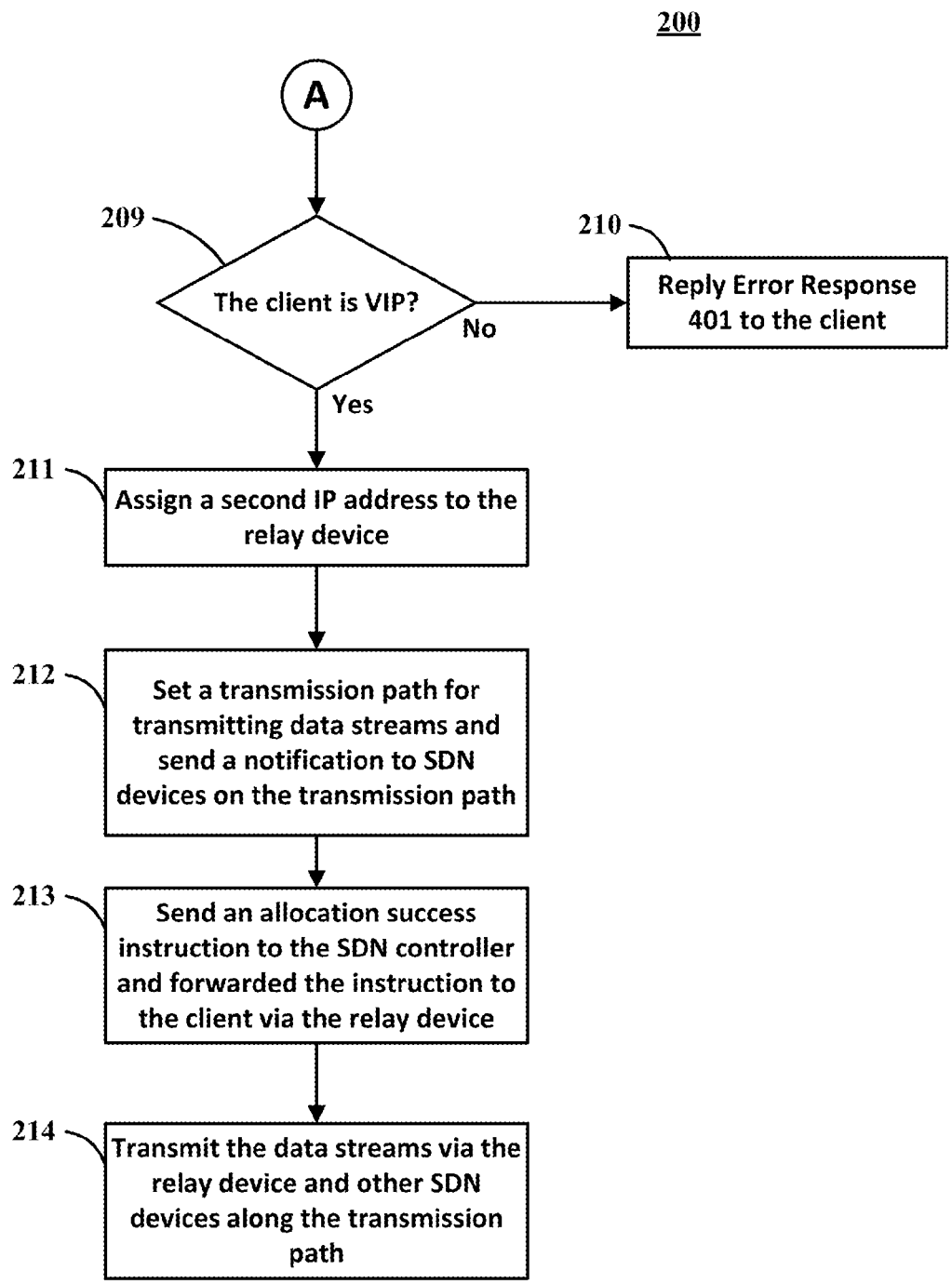

FIGS. 2A and 2B illustrate a flowchart of an embodiment of an SDN network communication method in accordance with the present disclosure Referring to FIGS. 2A and 2B, a flowchart is presented in accordance with an example embodiment of a method 200 for the SDN network communication. The SDN network communication method 200 is provided by way of example, as there are a variety of ways to carry out the method. The method 200 described below can be carried out using the configurations illustrated in FIG. 1, for example, and various elements of these figures are referenced in explaining the processing method 200. Each step shown in FIGS. 2A and 2B represents one or more processes, methods, or subroutines, carried out in the exemplary processing method 200. Additionally, the illustrated order of blocks is by example only and the order of the blocks can change. The network communication method 200 begins at block 201.

At block 201, the master TURN server 140 receives an allocation request from the client A.

At block 202, the master TURN server 140 implements identity authentication to the client A to determine whether the client A is a very important person (VIP).

At block 203, if the identity authentication is failed, the master TURN server 140 replies a first preset message, an error response 401, for example, to the client A. The error response 401 refers to Unauthentication defined in the HyperText Transfer Protocol (HTTP).

At block 204, if the client A is the VIP, the master TURN server 140 selects one of the first forwarding device 110, the second forwarding device 115, the third forwarding device 120 and the fourth forwarding device 125 as a relay device, the third forwarding device 120, for example, via the SDN controller 160. A relay device for the client A may be, but is not limited to, the forwarding device nearest the client A.

At block 205, the master TURN server 140 assigns a first Internet Protocol (IP) address and an access port to the client A according to the allocation request. The first IP address and the access port are mapped to the shadow TURN server 150, and are used to enable the client A to transfer the allocation request to the shadow TURN server 150.

At block 206, the master TURN server 140 instruct the SDN controller 160 to define forwarding rules for the relay device, the third forwarding device 210, for example. The forwarding rules complies with the following conditions: (1) the forwarding rules comply with the TURN protocol; (2) a source address described in the forwarding rules is directed to the client A; and (3) a destination address described in the forwarding rules is directed to the shadow TURN server 150. Thus, the allocation request is forwarded to the SDN controller 160 according to the forwarding rules.

At block 207, the master TURN server 140 replies a second preset message, an error response 300, for example, to the client A. The error response 300, which refers to Multiple Choices defined in HTTP, carries an IP address of the shadow TURN server 150.

At block 208, the client A delivers the allocation request to the relay device, the third forwarding device 210, for example. The relay device forwarded the allocation request to the SDN controller 160 according to the forwarding rules. The SDN controller 160 then forwarded the allocation request to the shadow TURN server 150.

At block 209, when the allocation request is received, the shadow TURN server 150 implements identity authentication to the client A to determine whether the client A is a VIP.

At block 210, if the identity authentication is failed, the shadow TURN server 150 replies with a first preset message, an error response 401, for example, to the client A.

At block 211, if the client A is VIP, a second IP address is assigned to the relay device, the third forwarding device 210, for example.

At block 212, the shadow TURN server 150 instructs the SDN controller 160 to set a transmission path for transmitting data streams and sends a notification to SDN devices on the transmission path.

At block 213, the shadow TURN server 150 sends an allocation success instruction to the SDN controller 160. The SDN controller 160 forwards the allocation success instruction to the relay device, the third forwarding device 210, for example. The relay device then forwards the allocation success instruction to the client A.

At block 214, the client A transfers the data streams via the relay device, the third forwarding device 210, for example, and other SDN devices along the transmission path.

The embodiments shown and described above are only examples. Many details are often found in the art such as the other features of a server. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A computer-implemented method, the method comprising:
    receiving an allocation request from a client by a master Traversal Using Relays around Network Address Translation (TURN) server;
    determining, by the master TURN server, whether the client is a very important person (VIP);
    selecting, by the master TURN server, one of a plurality of forwarding devices as the relay device via a Software-Defined Networking (SDN) controller if the client is the VIP;
    assigning, by the master TURN server, a second IP address and an access port to the client according to the allocation request;
    instructing, by the master TURN server, the SDN controller to define forwarding rules for the relay device;
    replying, by the master TURN server, a second error response to the client; and
    enabling, by the master TURN server, the client to deliver the allocation request to the relay device, the relay device to forward the allocation request to the SDN controller according to the forwarding rules, and the SDN controller to forward the allocation request to the shadow TURN server;
    sending the allocation request by the client;
    determining whether the client is the VIP by a shadow TURN server when the allocation request is received;
    assigning a first IP address to a relay device by the shadow TURN when the client is the VIP;
    the shadow TURN server instructing the SDN controller to set a transmission path for transmitting data streams and sending a notification to SDN devices on the transmission path;
    sending, by the shadow TURN server, an allocation success instruction to the SDN controller, wherein the allocation success instruction is forwarded to the client via the SDN controller and the relay device; and
    the client transferring the data streams via the relay device and the SDN devices along the transmission path.

2. The method as claimed in claim 1, further comprising:
replying a first error response to the client if the client is not VIP.

3. The method as claimed in claim 1, wherein the second IP address and the access port are mapped to the shadow TURN server to enable the client to transfer the allocation request to the shadow TURN server.

4. The method as claimed in claim 1, wherein the forwarding rules comply with the TURN protocol, a source address described in the forwarding rules is directed to the client, and a destination address described in the forwarding rules is directed to the shadow TURN server.

5. The method as claimed in claim 1, wherein the second error response carries a second IP address of the relay device.

6. A non-transitory storage medium, storing a set of instructions, to perform a method comprising:
receiving an allocation request from a client by a master Traversal Using Relays around Network Address Translation (TURN) server;
determining, by the master TURN server, whether the client is a very important person (VIP);
selecting, by the master TURN server, one of a plurality of forwarding devices as the relay device via a Software-Defined Networking (SDN) controller if the client is the VIP;
assigning, by the master TURN server, a second IP address and an access port to the client according to the allocation request;
instructing, by the master TURN server, the SDN controller to define forwarding rules for the relay device;
replying, by the master TURN server, a second error response to the client; and
enabling, by the master TURN server, the client to deliver the allocation request to the relay device, the relay device to forward the allocation request to the SDN controller according to the forwarding rules, and the SDN controller to forward the allocation request to the shadow TURN server;
sending the allocation request by the client;
determining whether the client is the VIP by a shadow TURN server when the allocation request is received;
assigning a first IP address to a relay device by the shadow TURN when the client is the VIP;
the shadow TURN server instructing the SDN controller to set a transmission path for transmitting data streams and sending a notification to SDN devices on the transmission path;
sending, by the shadow TURN server, an allocation success instruction to the SDN controller, wherein the allocation success instruction is forwarded to the client via the SDN controller and the relay device; and
the client transferring the data streams via the relay device and the SDN devices along the transmission path.

7. The non-transitory storage medium as claimed in claim 6, further comprising:
replying a first error response to the client if the client is not the VIP.

8. The non-transitory storage medium as claimed in claim 6, wherein the second IP address and the access port are mapped to the shadow TURN server to enable the client to transfer the allocation request to the shadow TURN server.

9. The non-transitory storage medium as claimed in claim 6, wherein the forwarding rules comply with the TURN protocol, a source address described in the forwarding rules is directed to the client, and a destination address described in the forwarding rules is directed to the shadow TURN server.

10. The non-transitory storage medium as claimed in claim 6, wherein the second error response carries a second IP address of the relay device.

11. A server, applied to an Software-Defined Networking (SDN) network communication system, comprising:
at least one processor;
a storage system; and
one or more programs that are stored in the storage system and executed by the at least one processor, the one or more programs comprising instructions for:
receiving an allocation request from a client by a master Traversal Using Relays around Network Address Translation (TURN) server;
determining, by the master TURN server, whether the client is a very important person (VIP);
selecting, by the master TURN server, one of a plurality of forwarding devices as the relay device via a SDN controller if the client is the VIP;
assigning, by the master TURN server, a second IP address and an access port to the client according to the allocation request;
instructing, by the master TURN server, the SDN controller to define forwarding rules for the relay device;
replying, by the master TURN server, a second error response to the client; and
enabling, by the master TURN server, the client to deliver the allocation request to the relay device, the relay device to forward the allocation request to the SDN controller according to the forwarding rules, and the SDN controller to forward the allocation request to the shadow TURN server;
sending the allocation request by the client;
determining whether the client is the VIP by a shadow TURN server when the allocation request is received;
assigning a first IP address to a relay device by the shadow TURN when the client is the VIP;
the shadow TURN server instructing the SDN controller to set a transmission path for transmitting data streams and sending a notification to SDN devices on the transmission path;
sending, by the shadow TURN server, an allocation success instruction to the SDN controller, wherein the allocation success instruction is forwarded to the client via the SDN controller and the relay device; and
the client transferring the data streams via the relay device and the SDN devices along the transmission path.

12. The server as claimed in claim 11, further comprising instructions for:
replying a first error response to the client if the client is not the VIP.

13. The server as claimed in claim 11, wherein the second IP address and the access port are mapped to the shadow TURN server to enable the client to transfer the allocation request to the shadow TURN server.

14. The server as claimed in claim 11, wherein the forwarding rules comply with the TURN protocol, a source address described in the forwarding rules is directed to the client, and a destination address described in the forwarding rules is directed to the shadow TURN server.

15. The server as claimed in claim 11, wherein the second error response carries a second IP address of the relay device.

* * * * *